(12) United States Patent
Madsen

(10) Patent No.: US 9,925,103 B2
(45) Date of Patent: Mar. 27, 2018

(54) ELECTRIC ACTUATOR SYSTEM

(71) Applicant: LINAK A/S, Nordborg (DK)

(72) Inventor: Allan H. Madsen, Sønderborg (DK)

(73) Assignee: Linak A/S, Nordborg (DK)

( * ) Notice: Subject to any disclaimer, the term of this patent is extended or adjusted under 35 U.S.C. 154(b) by 211 days.

(21) Appl. No.: 14/652,342

(22) PCT Filed: Dec. 13, 2013

(86) PCT No.: PCT/DK2013/000087
§ 371 (c)(1),
(2) Date: Jun. 15, 2015

(87) PCT Pub. No.: WO2014/090253
PCT Pub. Date: Jun. 19, 2014

(65) Prior Publication Data
US 2016/0213536 A1    Jul. 28, 2016

(30) Foreign Application Priority Data
Dec. 14, 2012    (DK) .................... 2012 00792

(51) Int. Cl.
*G05B 15/02* (2006.01)
*A61G 7/018* (2006.01)

(52) U.S. Cl.
CPC ............ *A61G 7/018* (2013.01); *G05B 15/02* (2013.01); *G05B 2219/2608* (2013.01)

(58) Field of Classification Search
CPC ........................................ G05B 15/02
USPC ............................... 318/490, 34, 3
See application file for complete search history.

(56) References Cited

U.S. PATENT DOCUMENTS

| 5,205,004 | A | 4/1993 | Hayes et al. | |
|---|---|---|---|---|
| 7,066,041 | B2 | 6/2006 | Nielsen | |
| 7,893,645 | B2* | 2/2011 | Kneller | B64D 11/003 |
| | | | | 312/248 |
| 8,165,718 | B2* | 4/2012 | Ota | A61G 7/08 |
| | | | | 382/153 |
| 8,483,876 | B2* | 7/2013 | Ohno | G05D 1/0246 |
| | | | | 700/255 |
| 2008/0109654 | A1 | 5/2008 | Hardacker et al. | |
| 2008/0127419 | A1 | 6/2008 | Jensen | |
| 2009/0139029 | A1 | 6/2009 | Rawls-Meehan | |
| 2010/0161969 | A1 | 6/2010 | Grebovich et al. | |

FOREIGN PATENT DOCUMENTS

WO    2006039929    4/2006

* cited by examiner

*Primary Examiner* — David S Luo
(74) *Attorney, Agent, or Firm* — Dykema Gossett PLLC

(57) ABSTRACT

A communication system for exchanging data between an actuator system and an external device, e.g. an operation where the communication system in the form of a gateway and a codex interprets the information in the bidirectional data stream and communicates the information on both sides. The communication system is furthermore provided with an RFID circuit integrated in a handset. The RFIC circuit can communicate information about the gateway's unique identification, also known as an MAC-address. This achieves easy connection of an external device to the actuator system without having to enter data manually.

13 Claims, 1 Drawing Sheet

ELECTRIC ACTUATOR SYSTEM

Figure 1:
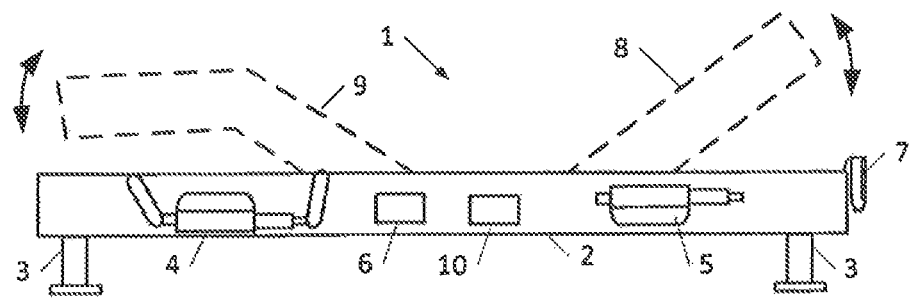

The present invention relates to an electric actuator system comprising a linear actuator, a controller, a power supply, where the actuator system is provided with a wireless interface for receiving a signal or transmitting a signal. The actuator system can thereby be operated and monitored wirelessly. The invention also relates to a terminal that can be connected to the actuator system. The invention also relates to a hospital bed or care bed wherein the electric actuator system is fitted.

The electric actuator system is well suited for adjustable beds such as hospital beds or care beds. The mattress in those kinds of beds is carried by a supporting surface that can be raised and lowered with the aid of the electromechanical linear actuators, which are fitted in the actuator system. Furthermore, the backrest and legrest sections of the beds can also be adjusted with the aid of linear actuators. The linear actuators are primarily of the type comprising a piston rod, as described e.g. in WO 02/29284 A1 Linak A/S.

The electric actuator systems are supplied, i.a. as subcontracted goods for manufacturers of hospital and care beds. The bed manufacturers often wish to use their own operating and monitoring devices. It may also be required that the bed and therewith the actuator system can be connected to a hospital system to be able to monitor the bed and control it remotely.

The connection of the actuator system is often made wirelessly to the bed manufacturer's equipment via Wi-Fi, Bluetooth or other radio technology. To establish a connection between the wireless gateway of the actuator system and the bed manufacturer's equipment, the MAC (Media Access Control) address on the wireless gateway of the actuator system, is read into the bed manufacturer's equipment. This ensures that the operation of the actuator system can only be undertaken with the specific equipment connected thereto. The MAC-address for the gateway is unique and can be found in the documentation that comes with the actuator system. Furthermore the MAC-address is specified on a label that is attached to the actuator system, typically either on the gateway module or on the controller. When an actuator system is connected to a bed-manufacturer's equipment, e.g. a terminal, it is therefore necessary to either consult the actuator system documentation or crawl under the bed to find and read the information specified on the label regarding the gateway's MAC-address. Since the code is long, there is a risk of wrongly entering it into the bed manufacturer's equipment with the inconvenience this may cause.

It is not desirable for the bed manufacturer's equipment to pick up a broadcast of MAC-addresses over the air, such that they can be chosen from a list. If the wrong number is selected, the terminal will inadvertently be brought into a state in which it will operate another bed. It would be very unfortunate, if the actuator system were inadvertently adjusted in a bed accommodating a patient with a fracture of the musculoskeletal system or back.

There is therefore a need to improve the actuator system in respect of achieving a more secure and simple way of transferring information about the network identification of the wireless interface to a bed manufacturer's equipment with the aim of connecting the devices to one another.

This is achieved according to the invention in that the actuator system is provided with an RFID (Radio Frequency Identification) circuit which is equipped to communicate information of the network identification of the wireless interface.

The read range for an RFID varies according to type from few millimeters up to approximately a meter according to the state-of-the-art, but to avoid accidental connections to other actuator systems a short range is desirable for this application. A range of over twenty centimeters is therefore not desirable.

The RFID circuit may be of the type containing a unique code that can be removed when the RFID circuit is read into the equipment suitable therefore. Such RFID exists in a more advanced embodiment, where it is possible to store data in a memory arranged in connection with the RFID circuit and which can subsequently be read by the reading equipment. In this type, it will be possible to store the information about the network identification of the wireless interface that is embedded in the RFID circuit. In one embodiment this information can be programmed manually.

In another embodiment, the information about the network identification of the wireless interface that is embedded in the RFID circuit is transferred from the actuator system. This can be done if the actuator system is provided with means for programming the RFID circuit. The programming may either be done wireless or wired.

From the statement of the problem, it is given that the RFID circuit shall be arranged in connection with the actuator system, but in such a way that it is possible to achieve the necessary proximity to the bed manufacturer's equipment that is to be connected.

In one embodiment the RFID circuit is arranged in an operating device that is connected to the actuator system. More specifically, an actuator system is normally provided with an operating device that can be used when the bed is not connected to a bed manufacturer's equipment. The operating device is connected to the controller of the actuator system and is thus downstream of the actuator system. The operating device contains contacts that can activate the functions of the actuator system. Furthermore, by arranging the RFID circuit in the same housing as the operating device, the advantage is achieved that the operating device with the RFID circuit in a simple and easy way can be brought in proximity to the bed manufacturer's equipment, which contains an RFID reader by which the information about the network identification of the wireless interface can be communicated. The solution is at the same time discrete and practical, as the RFID circuit does not make the operating device large in size or more complex. The positioning is discreet in such a way as to be understood that the personnel who are to use the RFID circuit are informed of the RFID circuit's location, but outside parties will not necessarily find out its location. The RFID circuit is furthermore protected against wear and will always be "to hand" when it is to be used.

The RFID circuit may be arranged on a printed circuit board (PCB) for the operating device, which PCB is also provided with operating contacts for operating the actuator system. Such a PCB is often referred to as a membrane keyboard, as the contacts are embedded between several layers of membrane.

In one embodiment the memory, that is arranged in connection with the RFID-circuit memory, may be programmable via an electrical connection that is extended via the handset cable to the actuator system in such a way that the RFID circuit memory is updated with the MAC address that belongs to the actuator system gateway when the handset is connected to the actuator system via the cable connection.

In another embodiment, the RFID circuit is equipped to prevent retrieval of the memory if the handset cable has not been connected to the actuator system. This prevents a disconnected hand set from establishing a connection between a terminal and a gateway module.

In yet another embodiment, the RFID circuit is arranged on a circuit board that is designed as a plastic card of the credit card type. The RFID circuit may also be arranged in a foil that can be self-adhesive. This embodiment will provide a plurality of possibilities for placing of the RFID circuit although it is essential for safety reasons to ensure that the RFID circuit is downstream of the wireless gateway of the actuator system.

The embodiment having the RFID arranged on a card has obvious advantages if the handset is equipped with a holder for receiving the card with the RFID circuit. The holder may be passive so that the card only helps to position the RFID circuit in the operating device. In another embodiment, the holder may be provided with an interface for the RFID circuit, so that information about the network identification of the wireless interface can be communicated from the gateway module via the wired connection of the operating device to the controller.

If the card with the RFID circuit is not placed in a holder, for safety reasons it will be advantageous to provide the card with means for physically limiting the distance between the card and the actuator system. To ensure that the card remains the unique identifier for the actuator system, in one embodiment the card may be provided with a cord, which at one end is attached to the actuator system and at the other end is attached to the card with the RFID circuit. In order to avoid the cord getting in the way, it may be elastic, so that the card can be drawn along in proximity to the bed manufacturer's equipment when required and then, when the card is released, the elastic cord will ensure that the card again is fairly close to the actuator system. The cord may possibly be rolled up on a roller of the type known from automatically rolling up vacuum-cleaner power cords or cords for ski passes.

The design of the RFID circuit places demands on the bed-manufacturer's equipment regarding reading and deciphering the information of the wireless network identification of the interface. If the bed manufacturer's equipment is a terminal, which is equipped for a connection to the wireless interface on the electric actuator system, the terminal must be provided with means for reading and deciphering the information communicated via the RFID circuit regarding the actuator system's network identification of the wireless interface, and means for linking a wireless network connection to the actuator system. It is simple to establish a connection if the bed-manufacturer's equipment is able to read the MAC-address on the gateway's wireless interface directly from the RFID circuit. In so far as the RFID circuit is unable to communicate the MAC address directly, the bed manufacturer's equipment must be capable of reading the RFID circuit's UID (unique identifier code) and confer with a list which, based on the RFID circuit's UID, specifies the MAC address on the actuator system's wireless gateway. Such a list can be handled locally but can also be consulted through searching a server containing the list. The terminal can also be configured to require the RFID circuit's UID and the information stored about the MAC-address in the RFID circuit's memory to be identical a composed set of information regarding the UID and the MAC-address stored in the terminal. This achieves greater certainty that the terminal remains connected to the particular gateway and only that one. Characteristically, a holder that is adapted to receive an RFID circuit can be built into a terminal. In this way it can be ensured that the terminal only connects to the gateway so long as the terminal is within the immediate vicinity of the actuator system gateway. It is advantageous that, for receiving an RFID circuit, such a holder can be arranged in any external device that can be connected to the actuator system via the gateway with the purpose of, in a simple and secure manner, communicating information about the gateway's MAC-address or other information about connection thereto.

The invention generally relates to electric actuator systems that may form a part of any construction even though the invention is explained with the aid of a bed. When we are referring to a bed and actuator system here, we are referring to a hospital bed or a care bed comprising the electric actuator system.

Figure 2:
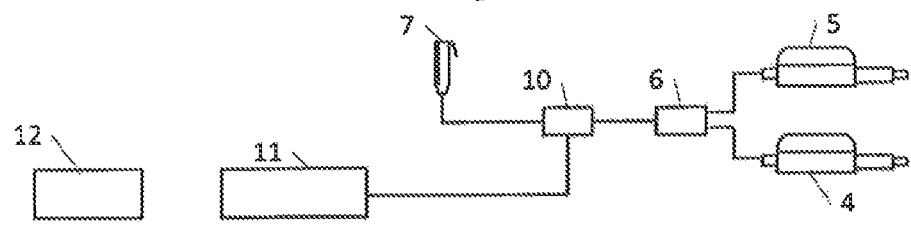
Figure 3:
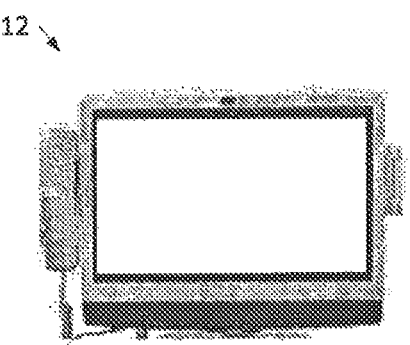
Figure 4:
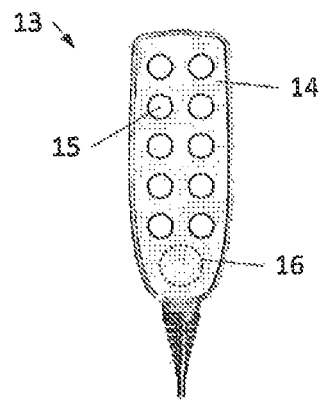
Figure 5:
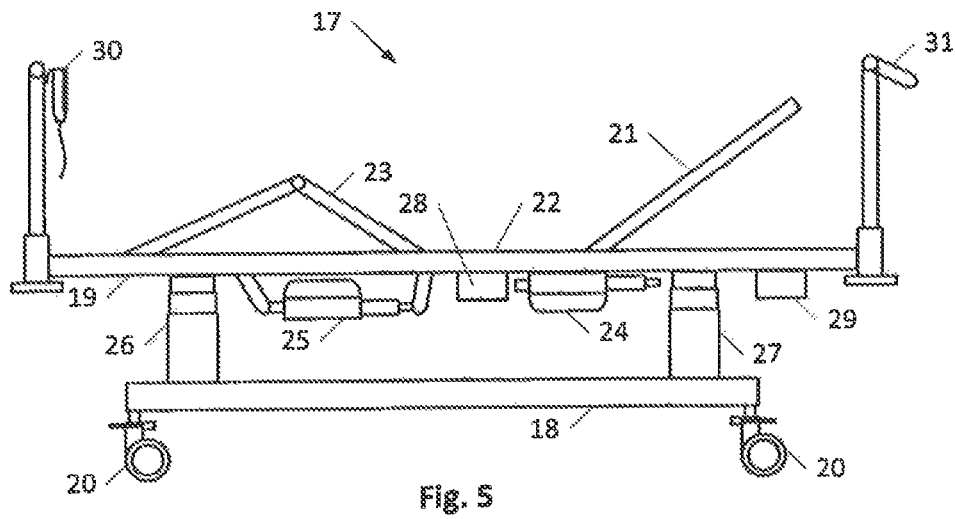

An embodiment of the actuator system according to the invention will be described more fully below with reference to the attached drawings, wherein:

FIG. 1 shows a schematic view of a care bed comprising the actuator system,

FIG. 2 shows a schematic view of the actuator system in the care bed shown in FIG. 1, FIG. 3 shows a terminal (for use for the patient), FIG. 4 shows a handset for operating the actuator system, and FIG. 5 shows a hospital or care bed comprising an actuator system, The care bed schematically shown in FIG. 1 comprises a mattress (not referenced) carried by a sub frame 2, which then is supported by a set of legs 3. The care bed 1 has an actuator system (schematically represented in FIG. 2) that comprises two linear actuators 4, 5 connected to a control box 6 and an operating device 7. The control box 6 comprises a controller and a power supply. The linear actuators 4, 5 can adjust the bed's back rest section 8 and leg rest section 9. The actuator system has a network, which is run as a serial data stream, to which data from the actuator system's devices can be converted and communicated. The network is powered by a microprocessor in the control box 6. The serial data stream is timed by a clock signal and the data stream transmits data packages that comprise an identification part and a data part.

The actuator system furthermore comprises a junction box 10, that is connected between the control box 6 and the operating device 7. The junction box 10 also includes a gateway module 11 that can communicate to the gateway at a residential home, care home or hospital. The communication may be wired or wireless. In another embodiment, the actuator system, including the junction box 10, comprises a module that enables communication on the Internet, the mobile telephone network or through another wireless network. Regarding the gateway module 11, the interface to an external device can be wired or wireless, for example through WLAN or Bluetooth.

The drawing in FIG. 3 shows a terminal 12 that is used by the patient for countless functions including adjustment of the actuator system. The terminal is equipped with a Wi-Fi type wireless radio connection and can therefore be connected to the actuator system via the gateway module. To set-up and maintain the connection, one must key in the address on the gateway module's wireless interface, also called the MAC-address. The terminal is however provided with an RFID reader that is equipped to be able to read an RFID that is placed within the immediate vicinity of the reader. This information that is read from the RFID module is in the smallest RFID module's unique ID but can, in an especially relevant embodiment, be enlarged to also be able to read information that is stored in an electric memory designed in connection with the RFID circuit. If the information stored in this memory is the MAC-address on the gateway module, the terminal can, in an easy and simple way, read the information about the desired connection and then establish it. This avoids an inadvertent connection of a patient's terminal to another bed's actuator system, reinforcing patients' safety. It will for example be associated with major harm and disorder if a bed accommodating a patient with a fractured musculoskeletal system were accidentally adjusted. This naturally requires that the RFID circuit with the information is maintained strictly connected to the actuator system and arranged in its proximity. The RFID circuit may also be updated with the correct information about the gateway module's MAC-address.

FIG. 4 shows a handset 13 for an actuator system. The handset 13 has a foil 14 with keys. An RFID circuit 16, indicated with dotted lines, has also been inserted in the foil's lamination. This may be an RFID circuit with in-built memory. The RFID circuit may be inserted as a passive circuit without provision or possibility of electrical interface to the memory device. The memory in the passive circuit in this embodiment is programmed through the RFID circuit's wireless interface. In another embodiment, the RFID circuit's memory is programmable via an electrical connection that is extended via the handset's cable so that the RFID circuit's memory is updated with the MAC-address that belongs to the actuator system's gateway, when the handset is connected to the actuator system through the cable connection. When the handset is brought in proximity to the terminal's reading device for reading an RFID circuit, it is thereby possible to read the MAC-address on the actuator system's gateway and establish a connection to it. It is obvious that this function must not be able to be activated automatically or by the patient, but has to be a function that can only be activated by authorised nursing or servicing personnel. In another embodiment the RFID circuit is further equipped to prevent retrieval of the memory if a handset's cable is not connected to the actuator system. This prevents a disconnected handset from being used to create a connection between a terminal and a gateway module. This also promotes patient safety. In another embodiment the RFID circuit can be integrated on the handset's printed circuit board (PCB).

The hospital bed 17 shown in FIG. 5 comprises a sub-frame 18 and an upper frame 19, where the sub-frame 18 is provided with drive wheels 20. An adjustable supporting surface for a mattress is mounted on the upper frame 19. The supporting surface comprises a back rest section 21, an articulated leg rest section 22 and a fixed middle section 23 between these. The back rest and leg rest sections 21, 22 can be adjusted each with its own actuator 24, 25 so the supporting surface is able to form different shapes. The upper frame 19 is connected to the sub-frame 18 with two linear actuators designed as lifting columns 26, 27. The actuators 24, 25, 26, 27 are connected to a control box 28 containing a power supply for connection to the mains, a rechargeable battery as well as a controller.

To the control box 28 is connected a junction box 29 for connecting operating devices such as handsets 30, terminals 31 and any other equipment. The actuator system's devices i.e. operating devices 30, 31 actuators 24, 25, 26, 27, control box 28, junction box 29 and other connected devices communicate in a network that is run as a serial data stream to which all devices can convert data. The actuator system in the hospital bed 17 functions as described in connection with the care bed in FIG. 1.

The invention claimed is:

1. An electric actuator system comprising:
a linear actuator,
a controller,
a power supply,
a wireless interface coupled to the controller for receiving a signal from or transmitting a signal to an external device, and wherein the wireless interface comprises a network identification associated therewith that comprises a unique identification of the wireless interface, wherein the electric actuator system is also provided with an RFID circuit which is equipped to communicate information about the network identification of the wireless interface.

2. The electric actuator system according to claim 1, wherein the information about the network identification of the wireless interface, which network identification is embedded in the RFID circuit, is programmed manually.

3. The electric actuator system according to claim 1, wherein the information about the network identification of the wireless interface, which network identification is embedded in the RFID circuit, is transmitted from the wireless interface for receiving a signal or transmitting a signal.

4. The electric actuator system according to claim 1, wherein the actuator system comprises an operating device, and wherein the RFID circuit is arranged in the operating device.

5. The electric actuator system according to claim 4, wherein the operating device comprises a printed circuit board provided with operating contacts for operating the actuator system and wherein the RFID circuit is arranged on the circuit board.

6. The electric actuator system according to claim 1, comprising a control box wherein the controller is arranged and to which the linear actuator is connected.

7. The electric actuator system according to claim 1, comprising a junction box connected to the controller and wherein the junction box comprises the wireless interface for receiving the signal or transmitting the signal.

8. A hospital bed or care bed comprising the electric actuator system according to claim 1.

9. The electric actuator system of claim 1 wherein the external device comprises a terminal having means to read and decipher the information that is transmitted via the RFID circuit about the network identification of the wireless interface of the actuator system and means to establish a wireless network connection to the actuator system.

10. An electric actuator system comprising:
a linear actuator,
a controller,
a power supply,
a wireless interface for receiving a signal or transmitting a signal, and wherein the wireless interface comprises a network identification, wherein the electric actuator system is also provided with an RFID circuit which is equipped to communicate information about the network identification of the wireless interface, wherein the information about the network identification of the wireless interface, which network identification is embedded in the RFID circuit, is programmed manually, wherein the RFID circuit is arranged on a card, preferably a plastic card of the credit card type.

11. The electric actuator system according to claim 10, wherein the operating device is equipped with a holder for receiving the card with the RFID circuit.

12. The electric actuator system according to claim 10, wherein the card is provided with means for physically limiting the distance between the card and the actuator system.

13. A terminal for connection to a wireless interface on an electric actuator system wherein the electric actuator system comprises a linear actuator, a controller, a power supply, and the wireless interface for receiving a signal or transmitting a signal, and wherein the wireless interface comprises a network identification, wherein the electric actuator system is also provided with an RFID circuit which is equipped to communicate information about the network identification of the wireless interface, wherein the terminal is provided with means to read and decipher the information that is transmitted via the RFID circuit about the network identification of the wireless interface of the actuator system and means to establish a wireless network connection to the actuator system.

* * * * *